United States Patent [19]

Kohno

[11] Patent Number: 5,362,137
[45] Date of Patent: Nov. 8, 1994

[54] BRAKE FLUID PRESSURE CONTROL UNIT

[75] Inventor: Teruhisa Kohno, Itami, Japan

[73] Assignee: Sumitomo Electric Industries, Ltd., Osaka, Japan

[21] Appl. No.: 111,787

[22] Filed: Aug. 26, 1993

[30] Foreign Application Priority Data

Aug. 27, 1992 [JP] Japan ................................. 4-228815
Jul. 15, 1993 [JP] Japan ................................. 5-175219

[51] Int. Cl.$^5$ .................. B60T 13/18; B60T 13/88; B60T 17/02
[52] U.S. Cl. ........................ 303/10; 303/20; 303/116.4; 303/119.2
[58] Field of Search .............. 251/129.01; 303/119.2, 303/10, 11, 20, 116.4; 417/423.14

[56] References Cited

U.S. PATENT DOCUMENTS 4,953,918 9/1990 Hashida et al. ............ 303/116.4 X
5,244,262 9/1993 Kehl et al. .................. 303/119.2

FOREIGN PATENT DOCUMENTS 553812 8/1993 European Pat. Off. ......... 303/119.2
2225168 5/1990 United Kingdom ............. 303/119.2

Primary Examiner—Robert J. Oberleitner
Assistant Examiner—Alfred Muratori
Attorney, Agent, or Firm—Wenderoth, Lind & Ponack

[57] ABSTRACT

Brake fluid pressure control unit improved for smaller size and lower cost. A motor for a pump ms mounted in the circuit block and the pump is mounted on one axial end of the motor. The pressure adjusting units having solenoid valves are arranged around the motor. The case of the motor has a portion forming a part of a magnetic circuit through which magnetic fluxes produced in the coils or the solenoid valves flow.

15 Claims, 3 Drawing Sheets

BRAKE FLUID PRESSURE CONTROL UNIT

The present invention relates to a brake fluid pressure control unit for controlling the brake fluid pressure in the wheel cylinders in response to commands from an electronic control unit, thereby preventing wheel locking.

Such a brake fluid pressure control unit is used to add the antilock or traction control function to a vehicle brake device. It comprises a fluid pressure pump, an electric motor for driving the pump, and solenoid valves for opening and closing the fluid passages between the master cylinder and the wheel cylinders and the discharge passages leading from the wheel cylinders.

FIG. 6 shows one of such control units that is disclosed in U.S. Pat. No. 4,953,918. A circuit block 2 is mounted to the front part of a motor 1. This block houses a hydraulic motor 3 (generally a plunger pump) driven by the motor 1 and fluid passages opened and closed by solenoid valves 4a.

As shown in the figure, a conventional brake fluid pressure control unit has its circuit block 2, which comprises a pump unit 2a and a pressure adjusting unit 2b, disposed in front of the motor 1 and its solenoid valves 4a attached to the pressure adjusting unit 2b so as to extend in a direction perpendicular to the motor.

Since the motor 1 and the circuit block 2 were disposed in series with each other, conventional control units were rather large in size. Further, it was necessary to attach a magnetic circuit to each of a plurality of solenoid valves in each unit to guide the magnetic flux produced in the coil to the yoke. Thus, conventional control units required a large number of parts and were thus expensive.

On the other hand, in SAE PAPER 920647 is disclosed a control unit having its solenoid valves disposed ill parallel around the outer periphery of the motor to reduce its overall size. But this arrangement also requires two separate cases, one for the motor and the other for the solenoid valves. Thus, the overall size of the unit is large and the cost high.

An object of the present invention is to provide a brake fluid pressure control unit which is small in size and inexpensive.

Another object is to provide a brake fluid pressure control unit which can be easily coupled to an electronic control unit (from which driving signals are given to the fluid pressure control unit) which heretofore had to be mounted on a vehicle separately from the former.

According to the present invention, in order to provide a compact structure, the pump unit of the circuit block is mounted on one axial end of the motor and the pressure adjusting means is provided to surround the outer periphery of the motor. Further, the solenoid valves are provided parallel to the motor shaft. The motor is provided with a case having a portion thereof made of a magnetic material. This portion forms a part of a magnetic circuit through which magnetic fluxes produced in the coil of the solenoid valves pass. More specifically, the motor has a rear cover having a portion protruding outwards from the outer periphery of the motor. The solenoid valves are supported on the protruding portion of the rear cover. The rear cover is made of a magnetic material so as to use it as a part of the magnetic circuit of the solenoid valves. Further the body case of the motor, which forms a part of the magnetic circuit of the motor, is also used as a part of the magnetic circuit of the solenoid valves.

Further, the rear cover of the motor has a housing in which is housed an electronic control unit having a microcomputer. Lead wires from the solenoid valves and the motor are guided into the housing and electrically connected to a control circuit in the electronic control unit.

The control unit of the present invention is small in size because its pressure adjusting means (2b in FIG. including solenoid valves is disposed around the outer periphery of the motor.

The solenoid valves are supported on the rear cover of the motor. The rear cover and the body cover of the motor are also used as a part of the magnetic circuit of the motor and that of the solenoid valves. This serves to reduce the number of parts and the cost and weight of the entire unit.

Further, by housing an electronic control unit in a housing formed in the rear cover of the motor, the space for fluid pressure control unit can be utilized efficiently and the entire length of wiring from the solenoid valves and the motor to the electronic control unit can be reduced to a minimum. This leads to a further reduction in size, weight and cost.

Further, by using the motor rear cover as a housing for the electronic control unit, the fluid pressure control unit and the electronic control unit can be integrated into a one-piece unit before shipping. This greatly facilitates handling. Also, such a one-piece unit can be mounted on a car much more easily. This serves to reduce the size, weight and cost of the entire brake system.

Other features and objects of the present invention will become apparent from the following description made with reference to the accompanying drawings, in which:

FIGS. 1-5 show a preferred embodiment of the brake fluid pressure control unit according to the present invention.

Figure 1:
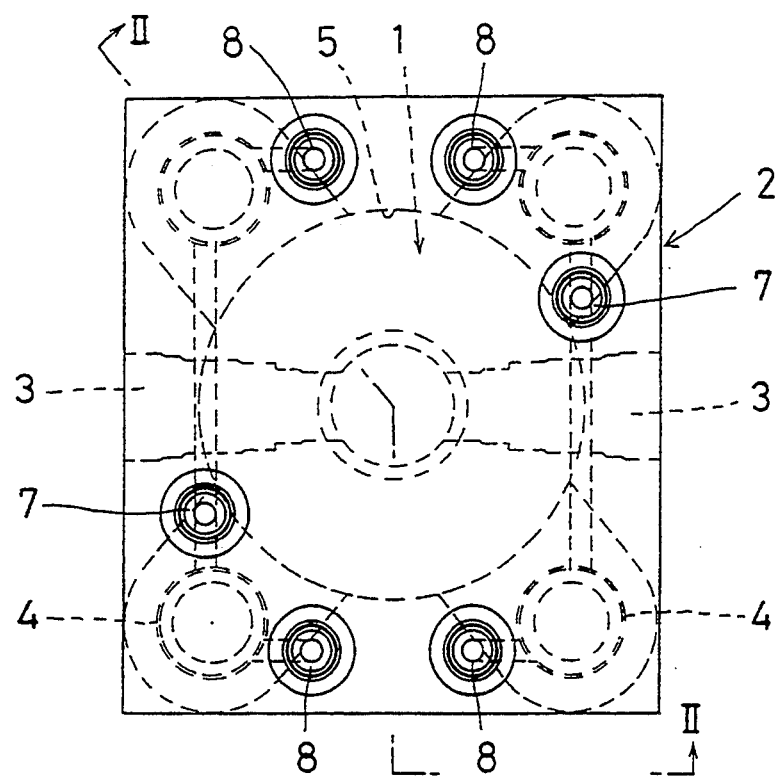
FIG. 1 is a plan view showing one embodiment of the brake fluid pressure control unit.

A motor 1 is fitted in a recess 5 formed in a circuit block 2 with part of its body case 1a and part of its rear cover 1b protruding from the circuit block 2.

Mounted in the circuit block 2 are a pressure adjusting unit 2b including pressure adjusting means 4 and a pump unit 2a. The positional relation between the units 2a and 2b are opposite to the conventional arrangement, with the unit 2b surrounding the outer periphery of the motor 1. The pressure adjusting means 4 include a flow control valve. Since such a valve is disclosed in U.S. Pat. No. 4,915,459, it is deemed not necessary to describe it in detail.

Solenoid valves 4a are secured to the rear face of the pressure adjusting unit 2b at its four corners so as to be parallel to the motor 1.

The motor rear cover 1b is secured to the circuit block 2 by means of bolts 8 so as to protrude outwardly from the body case 1a to support coils 4e of the solenoid valves 4a thereon. The solenoid valves 4a are urged by the brake fluid pressure in such a direction as to get out of the circuit block 2. The force urging the valves 4a is borne by the rear cover 1b.

Each solenoid valve has a stator 4b and a yoke 4d that are integral with the coil 4e. Thus, simply by tightening the bolts 8, the solenoid valves 4a as well as the motor 1 can be fixed in position. The control unit is thus assembled easily.

The body case 1a, made of a magnetic material, serves as a magnetic circuit. Namely, the magnetic flux produced in the coil of the motor 1 flows into the body case 1a. The magnetic flux produced in the coils 4e of each solenoid valve 4a flows through the stator 4b, armature 4c, yoke 4d and rear cover 1b. In other words, these parts act as a magnetic circuit. Thus, there is no need to provide extra members for forming a magnetic circuit between the yoke 4d and the stator 4b. Also, no coil support member is needed. The number of parts is thus small.

The motor body case 1a is reinforced by the circuit block 2, so that the former can be formed of a thin and low-strength material. This leads to a reduction in weight of the entire unit.

Figure 5:
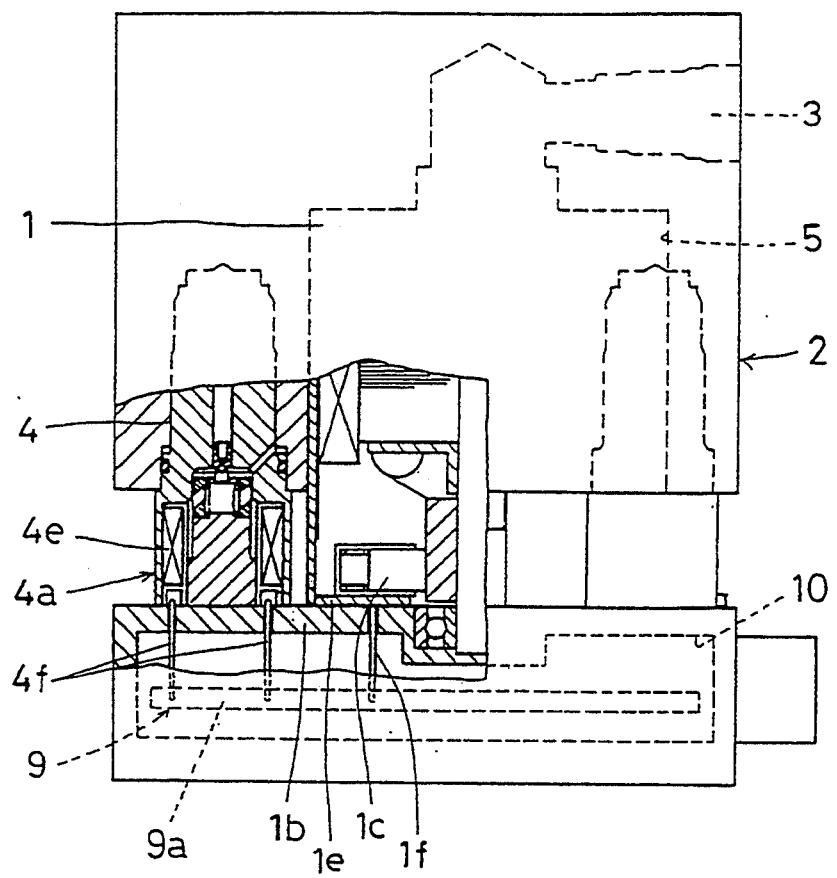
FIG. 5 is a partially cutaway side view of a portion of still another embodiment.
Figure 6:
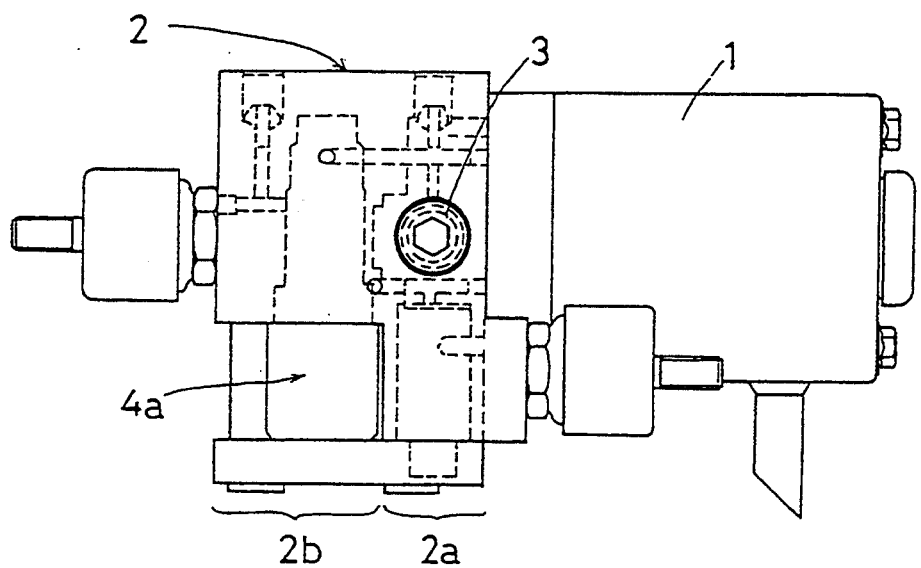
FIG. 6 is a side view of a prior art control unit.

Further, as shown in FIG. 5, the motor body case 1a may be used as part of the magnetic circuit of each solenoid valve coil 4e shown by arrow. With this arrangement, the yokes (4d of FIG. 2) provided around each coil can be omitted, so that the number of parts and the overall weight can be reduced still further.

Figure 4:
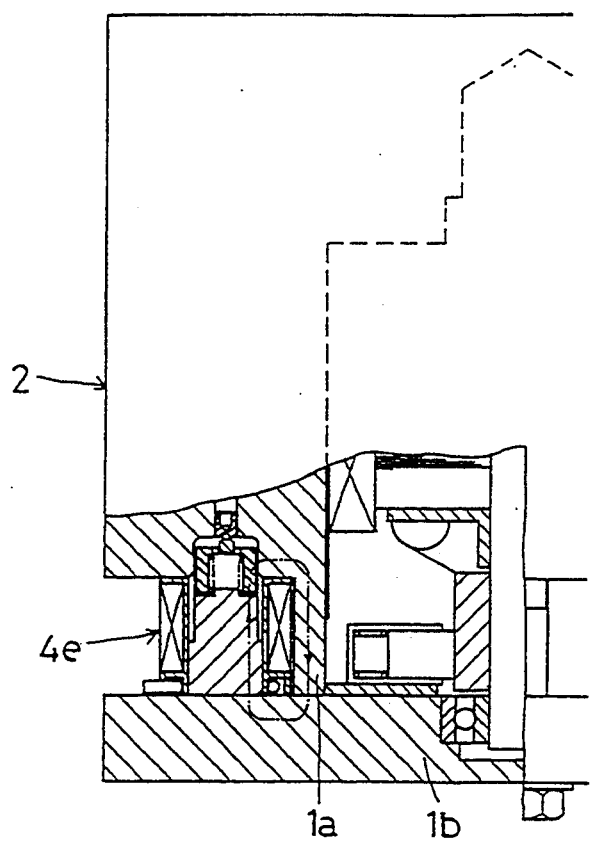
FIG. 4 is a partially cutaway side view of a portion of a further embodiment.

The circuit block 2 may be formed of a magnetic material so as to use it as the body case 1a of the motor. As shown in FIG. 4, the circuit block 2 serves as a common magnetic circuit member for all the solenoid valves 4a.

FIG. 5 shows an embodiment in which an electronic control unit 9 is mounted in the motor rear cover 1b. The rear cover 1b has a hollow space 10 in which is mounted the electronic control unit 9, which comprises a circuit board 9a and a microcomputer (not shown).

Figure 2:
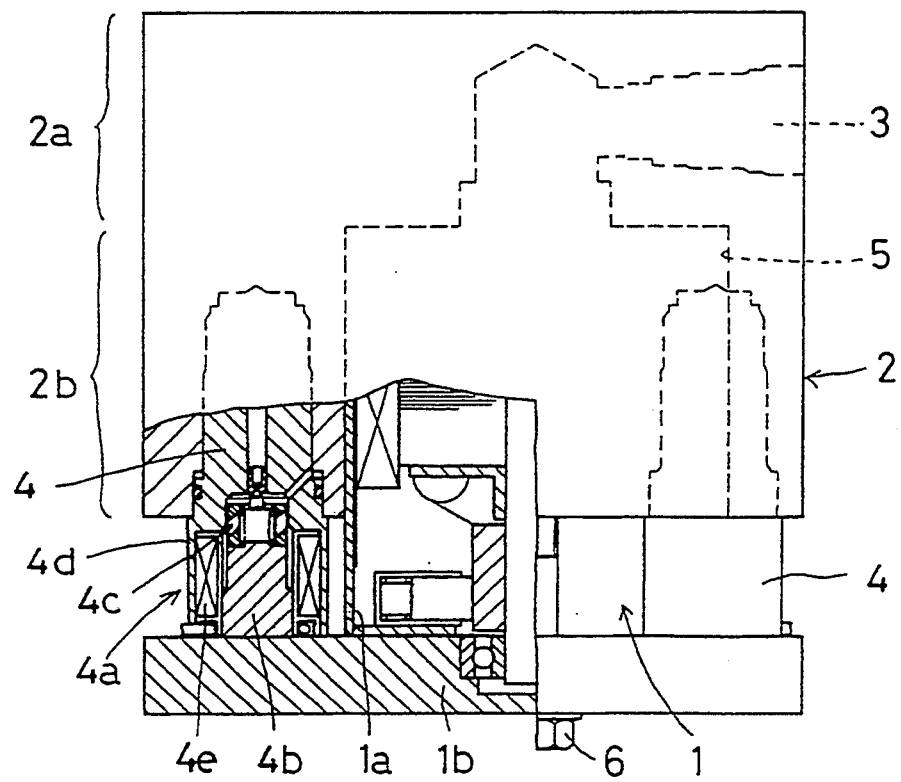
FIG. 2 is a side view partially cut away along line II—II of FIG. 1.
Figure 3:
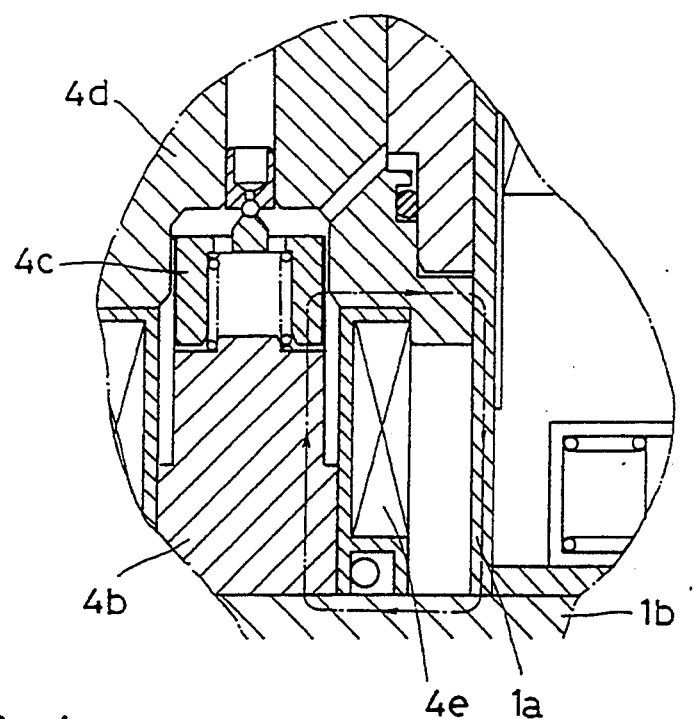
FIG. 3 is an enlarged sectional view of a portion of another embodiment.

Similar to the arrangement of FIG. 2, the solenoid valves 4a are kept in position by the rear cover 1b against the brake fluid pressure acting thereon. Also, lead pins 4f coupled to both ends of the coil 4e are inserted into the hollow space 10 through holes formed in the cover 1b and electrically connected to an electrical circuit on the circuit board 9a.

Another lead pin 1f, which extends from a brush base 1e coupled to a brush 1c of the motor 1, is electrically connected to a corresponding circuit on the circuit board 9a in the same manner as with the lead pins 4f.

The pressure adjusting means 4 may not include a flow control valve as disclosed in U.S. Pat. No. 4,915,459 but may consist of a solenoid valve only as shown in U.S. Pat. No. 3,617,098.

With this arrangement, since the rear cover 1b of the motor also serves as a housing for the electronic control unit, the fluid pressure control unit and the electronic control unit can be easily housed in a single unit. This will save space and simplify the wiring.

As shown in FIG. 1, this control unit has input ports 7 communicating with the master cylinder and output ports 8 leading to the wheel cylinders. The solenoid valves 4a serve to open and close the discharge circuits between the wheel cylinders and a low-pressure reservoir connected to the intake ports of pumps 3.

What is claimed is:

1. A brake fluid pressure control unit provided in a fluid passage extending between a master cylinder and wheel cylinders to control the brake fluid pressure in said wheel cylinders, said control unit: comprising a circuit block having a pump, a motor for driving said pump, and a pressure adjusting means including solenoid valves for opening and closing fluid passages, said pump in said circuit block being mounted on one axial end of said motor and said pressure adjusting means being provided so as to surround the outer periphery of said motor, said solenoid valves being provided parallel to the motor, said motor having a case having a portion thereof made of a magnetic material, said portion forming a part of a magnetic circuit through which magnetic fluxes produced in the coils of said solenoid valves pass.

2. A brake fluid pressure control unit as claimed in claim 1 wherein said motor has a rear cover made of a magnetic material and mounted to the axial end thereof opposite to said one axial end, said rear cover having a portion protruding outwards from the outer periphery of said motor, said solenoid valves being kept in position by the protruding portion of said rear cover against a brake fluid pressure, said rear cover forming a part of the magnetic circuit of said solenoid valves.

3. A brake fluid pressure control unit as claimed in claim 2 wherein said motor has a body case which forms a part of the magnetic circuit of said solenoid valves.

4. A brake fluid pressure control unit as claimed in claim 3 wherein said circuit block is made of a magnetic material and has a portion thereof used as said case of said motor.

5. A brake fluid pressure control unit as claimed in claim 4 wherein said rear cover of said motor has a housing in which is mounted an electronic control unit having a microcomputer and wherein connectors from said solenoid valves and said motor are guided into said housing and electrically connected to a control circuit on said electronic control unit.

6. A brake fluid pressure control unit as claimed in claim 3 wherein said rear cover of said motor has a housing in which is mounted an electronic control unit having a microcomputer and wherein connectors from said solenoid valves and said motor are guided into said housing and electrically connected to a control circuit on said electronic control unit.

7. A brake fluid pressure control unit as claimed in claim 2 wherein said circuit block is made of a magnetic material and has a portion thereof used as said case of said motor.

8. A brake fluid pressure control unit as claimed in claim 7 wherein said rear cover of said motor has a housing in which is mounted an electronic control unit having a microcomputer and wherein connectors from said solenoid valves and said motor are guided into said housing and electrically connected to a control circuit on said electronic control unit.

9. A brake fluid pressure control unit as claimed in claim 1 wherein said motor has a body case which forms a part of the magnetic circuit of said solenoid valves.

10. A brake fluid pressure control unit as claimed in claim 9 wherein said circuit block is made of a magnetic material and has a portion thereof used as said case of said motor.

11. A brake fluid pressure control unit as claimed in claim 10 wherein said rear cover of said motor has a housing in which is mounted an electronic control unit having a microcomputer and wherein connectors from said solenoid valves and said motor are guided into said housing and electrically connected to a control circuit on said electronic control unit.

12. A brake fluid pressure control unit as claimed in claim 9 wherein said rear cover of said motor has a housing in which is mounted an electronic control unit having a microcomputer and wherein connectors from said solenoid valves and said motor are guided into said housing and electrically connected to a control circuit on said electronic control unit.

13. A brake fluid pressure control unit as claimed in claim 1 wherein said circuit block is made of a magnetic material and has a portion thereof used as said case of said motor.

14. A brake fluid pressure control unit as claimed in claim 13 wherein said rear cover of said motor has a housing in which is mounted an electronic control unit having a microcomputer and wherein connectors from said solenoid valves and said motor are guided into said housing and electrically connected to a control circuit on said electronic control unit.

15. A brake fluid pressure control unit as claimed in of claim 1 wherein said rear cover of said motor has a housing in which is mounted an electronic control unit having a microcomputer and wherein connectors from said solenoid valves and said motor are guided into said housing and electrically connected to a control circuit on said electronic control unit.

* * * * *